(12) United States Patent
Ives

(10) Patent No.: US 8,166,010 B2
(45) Date of Patent: Apr. 24, 2012

(54) PROCESSING AND SENDING SEARCH RESULTS OVER A WIRELESS NETWORK TO A MOBILE DEVICE

(75) Inventor: Stephen Ives, Cambs (GB)

(73) Assignee: Taptu Limited, Cambridge (GB)

( * ) Notice: Subject to any disclaimer, the term of this patent is extended or adjusted under 35 U.S.C. 154(b) by 1839 days.

(21) Appl. No.: 11/189,312

(22) Filed: Jul. 26, 2005

(65) Prior Publication Data

US 2007/0027839 A1    Feb. 1, 2007

(51) Int. Cl.
*G06F 7/00* (2006.01)
(52) U.S. Cl. .................... 707/705; 715/864; 455/566
(58) Field of Classification Search .................. None
See application file for complete search history.

(56) References Cited

U.S. PATENT DOCUMENTS

| | | | |
|---|---|---|---|
| 2003/0037043 A1 | 2/2003 | Chang | |
| 2003/0046537 A1* | 3/2003 | Smith | 713/161 |
| 2003/0050931 A1* | 3/2003 | Harman et al. | 707/100 |
| 2004/0148571 A1* | 7/2004 | Lue | 715/514 |
| 2006/0259462 A1* | 11/2006 | Timmons | 707/3 |

OTHER PUBLICATIONS

Zhang, "Wireless Access to a Content Routing System", XP007901193 (On-Line), 201, pp. 1-2.
Sweeney, "Mobile Delivery of News Using Hierarchial Query-Biased Summaries", XP007901195 (On-Line), 2002, pp. 634-639.
Xie, "Efficient Browsing of Web Search Results on Mobile Devices . . ." PERCOM 2005, Mar. 8, 2005, pp. 17-26.
Jones, "Using Keyphrases as Search Result Surrogates on Small . . .", Personal and Ubiquitous Computing, vol. 8 No. 1, 2004, pp. 55-68.
August, "Mobile Web Searching", Bell Labs Technology, vol. 6, No. 2, 2002, pp. 84-98.
Mackay, The Impact of Migration of Data to Small Screens on Navigation, XP007901197 (On-Line), 2003, pp. 90-101.
Preliminary Report on Patentability issued Feb. 7, 2008 in corresponding PCT/GB2006/050183.

* cited by examiner

*Primary Examiner* — John E Breene
*Assistant Examiner* — Christopher J Raab
(74) *Attorney, Agent, or Firm* — Barnes & Thornburg LLP

(57) ABSTRACT

A search query is received over a wireless network (20), from a mobile device (10), and a response involves obtaining content summaries of search results relating to the search query, preparing a hypertext page for presentation by the mobile device. The page has a number of the content summaries extending over a number of screenviews. The page has an overview and has hyperlinks for intra-page navigation by a user between screenviews of different parts of the page. The page is sent to the mobile device over the wireless network to enable the content summaries to be browsed without requiring one or more further query and response operations across the wireless network. This can reduce the number of query response operations, by providing more information than the conventional one page annotated list, and presenting the information for easier browsing. The user can then download a selected content item over the network.

20 Claims, 9 Drawing Sheets

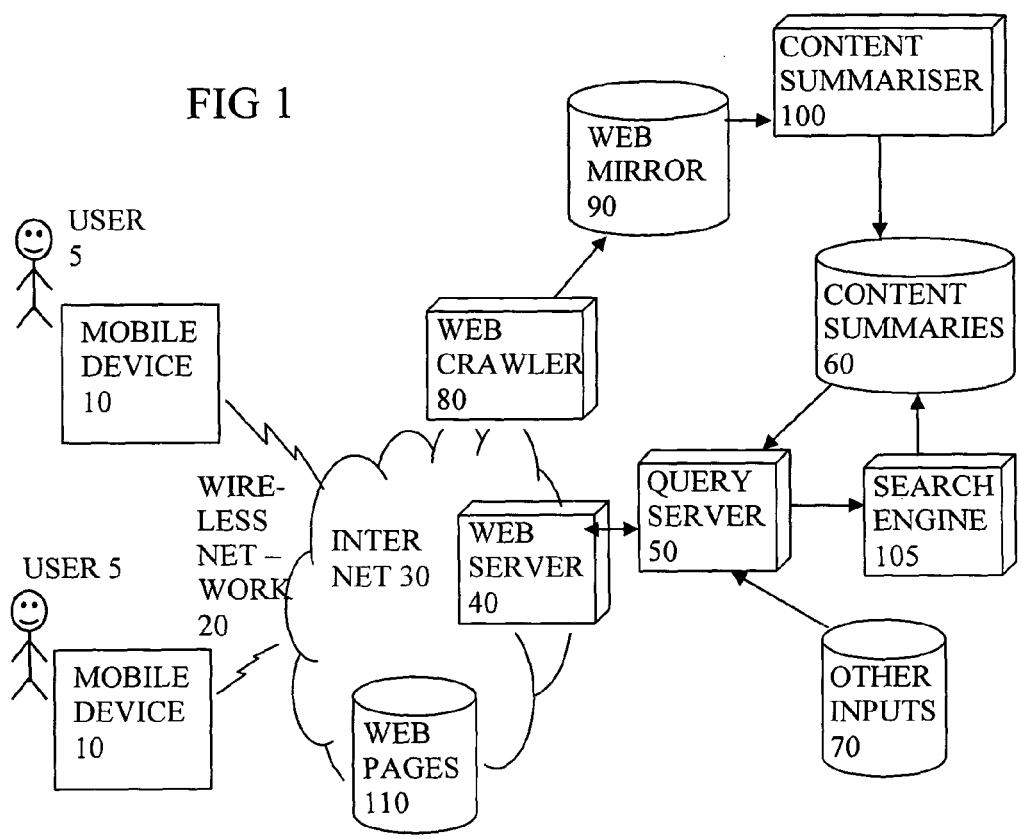
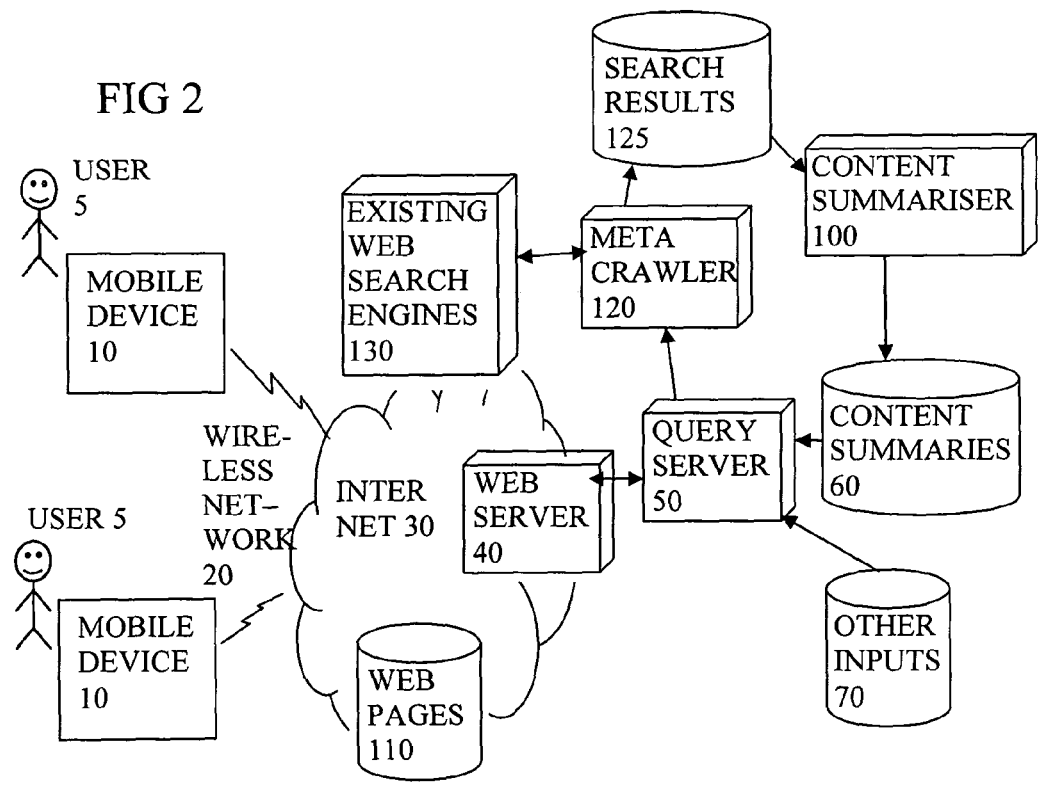

FIG 15
CONTENT SCREENVIEW A
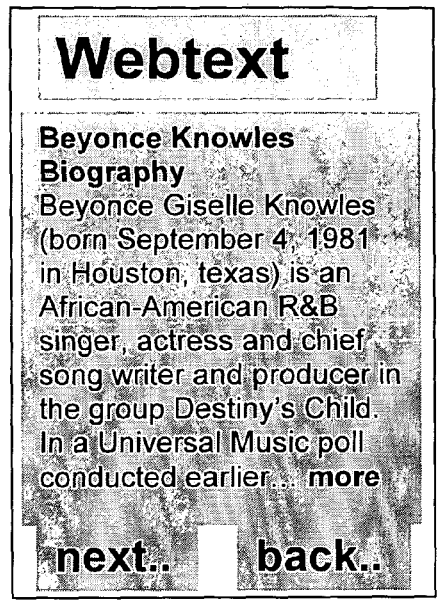
CONTENT SCREENVIEW B
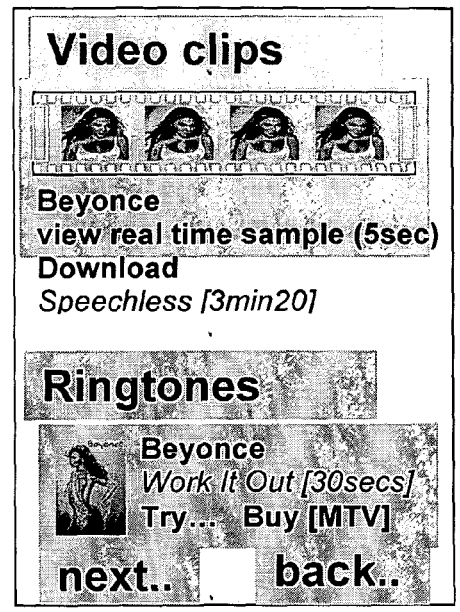
OVERVIEW SCREENVIEW C
OVERVIEW SCREENVIEW D
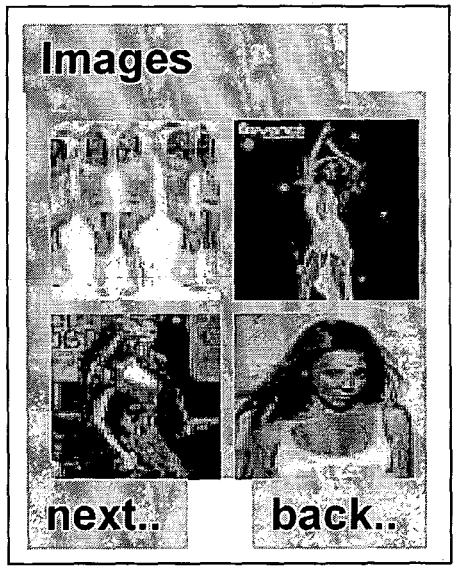

US 8,166,010 B2

PROCESSING AND SENDING SEARCH RESULTS OVER A WIRELESS NETWORK TO A MOBILE DEVICE

FIELD OF THE INVENTION

This invention relates to methods of searching over a wireless network, to methods of responding to a search query over a wireless network, to methods of providing a corresponding search front end service, and to corresponding apparatus or software.

DESCRIPTION OF THE RELATED ART

The world wide web is a massive store of useful (and useless) information. A good search tool enables general purpose access to this information store. Searching the world wide web is a well solved problem when accessing the web from a desktop personal computer (e.g. Google, Yahoo, et al). Mobile devices that are capable of accessing content on the world wide web are being increasingly numerous. However, pages designed specifically for the small screen sizes of mobile devices are very few. Further, there are only a few very simple search services available to mobile devices.

These search services perform poorly for several reasons:
  there are not enough mobile-specific pages available to provide relevant pages for most search queries,
  desktop-specific webpages cannot be easily rendered on the limited screen and limited browsers of mobile devices,
  direct translation of desktop-specific webpages to the specific markup language supported by most mobile devices (eg XHTML Basic and XHTML Mobile Profile) is a hard problem, and
  network requests suffer high latency regardless of the high bandwidths increasingly available, this means every click by a user on a link takes several seconds for a response regardless of the size of the response.

The information held in the world wide web is therefore very hard to access from a mobile device and particularly from a handset with a small screen. Search results are typically a page of links to candidate pages. Sometimes these links are accompanied by snippets of text from the candidate pages to assist the user in determining relevancy. The user must then click on these links in turn, possibly skipping seemly irrelevant links, in order to test or check whether the linked page contains the desired information.

This process works fine for a search when using a desktop personal computer connected using a good dial-up or broadband internet connection. It works less well for a mobile device. The slower network bandwidth and much higher connection latencies means each click to download a page takes several seconds. Testing ten or twenty pages, a typical number required to find target information, can therefore take many minutes. Further, both the list of results and each target page must usually be scrolled (often slowly by the limited capabilities of browsers found on mobile devices) line by line.

Attempted solutions already marketed have very low usage. User experience is very poor. Google Mobile uses transcoding of web pages to fit smaller screens, but is only partially successful and still suffers high latencies. The search results are still sent as a single page with a list of results including approximately 10 to 20 words as a summary for each result in the list.

SUMMARY OF THE INVENTION

An object of the invention is to provide improved apparatus or methods. According to a first aspect, the invention provides:

A method of responding to a search query across a wireless network, having the steps of obtaining content summaries of search results relating to the search query, preparing a package for presentation by a mobile device having a number of the content summaries extending over a number of screenviews for a screen of the mobile device, and having hyperlinks for intra-package navigation by a user between screenviews of different parts of the package, to enable the content summaries to be browsed without requiring one or more further query and response operations across the wireless network, the method having the further step of sending the package to the mobile device over the wireless network.

This can help to overcome physical limitations of mobile devices with limited capabilities for display or for scrolling or selecting, and physical limitations of the wireless network, make searching more rapid or convenient.

Additional features for dependent claims can include incorporating hyperlinks in the package for a user to download items from the search results across the wireless network to the mobile device, or obtaining the content summaries which comprises the step of accessing a database of previously generated content summaries to find those relating to the query. Another is obtaining the content summaries which comprises retrieving items relating to the query and deriving the summaries from the items found. The package can comprise any one or more of; a document in a hypertext mark up language, an XHTML Basic document, an XHTML Mobile Profile document, a file or files as application data for page type display by the mobile device. Incorporated in the package can be any one or more of; an overview screenview, an overview extending over more than one screenview, an overview having an indication of numbers of search results, and an overview having an indication of categories of content summaries. The overview can be derived by extracting from the content summaries any one or more of the following: a text title, text metadata, a text extract containing a keyword, a thumbnail image, sound extract, a storyboard of video frames, a portion of a video.

The search results can comprise any of; web pages on the world wide web, WAP pages, news feed items, pages from the deep web, geographical data, maps, points of interest locally, and local information, yellow pages, white pages, web pages on an intranet, descriptions of items or services for sale in an online marketplace or online store, and the content summaries comprising any one or more of; text, image, video, sound, advertising material. Tailoring any one or more of the content summaries, the size of the package, and locations of the hyperlinks in the package, can be carried out according to any one or more of the following factors; characteristics of the mobile device, bandwidth of the connection to the mobile device, latency or quality of the connection to the mobile device, user preferences, storage capacity of the mobile device, display characteristics of the mobile device, and user location.

A metacrawler can be used to identify and retrieve the items related to the search query. Deriving the content summary can comprise any of the following: removing advertising material, separating text from images, downsampling images, taking sample frames or extracts from a video, taking sample extracts of sounds, identifying news text, identifying image captions or image titles and associating them with their image. The method can have the preliminary step of preparing the database of content summaries, by extracting content summaries from the items, and storing them in the database, together with a reference to their corresponding item, and indexing the database, with one or more indications of relevancy to prioritise the items.

Another aspect of the invention provides:

A method of searching over a wireless network having the steps of sending a search query to a server, receiving at a mobile device a package having a number of content summaries of search results related to the search query, extending over a number of screenviews for a screen of the mobile device, and having hyperlinks for intra-package navigation between screenviews of different parts of the package, and the method having the steps of using the mobile device to present a screenview of a part of the package and using the hyperlinks to cause the mobile device to present different screenviews to browse the content summaries without requiring more query and response operations across the wireless network.

An additional feature is sending a request for a further package of more content summaries to be downloaded, and sending a request for items from the search results to be downloaded across the wireless network to the mobile device.

Another aspect of the invention provides:

A method of responding to a search query across a wireless network, having the steps of obtaining content summaries of search results relating to the search query, preparing a package for presentation by a mobile device having a number of the content summaries extending over a number of screenviews for a screen of the mobile device, at least some of the content summaries being arranged for display one per screenview, for a user to browse the content summaries without requiring one or more further query and response operations across the wireless network, the method having the further step of sending the package to the mobile device over the wireless network.

An additional feature is the package having no overview and the package having hyperlinks for intra-package navigation by a user between screenviews of different parts of the package.

Another aspect of the invention provides:

A method of responding to a search query across a wireless network, having the steps of obtaining content summaries of search results relating to the search query, preparing a package for presentation by a mobile device having a number of the content summaries extending over a number of screenviews for a screen of the mobile device, and an overview screenview, for a user to browse the content summaries without requiring one or more further query and response operations across the wireless network, the method having the further step of sending the package to the mobile device over the wireless network.

An additional feature is the page having hyperlinks for intra-package navigation by a user between screenviews of different parts of the package.

Other aspects of the invention provide corresponding methods of searching and receiving responses according to any of the methods, a program on a machine readable medium for carrying out any of the methods, or methods of providing a search front end service over a wireless network between a user and a search provider, corresponding to any of the methods. This can provide for situations where the front end is provided in the jurisdiction and other parts such as the search provider, are located outside the jurisdiction, or are provided by different parties.

These methods can provide more rapid and flexible browsing of search results than a conventional search service which returns only a single page annotated list of items, with no option to show more complete information, except by further query and response operations across the wireless network. By providing summaries in screenviews, and providing this in a single query-response cycle across the wireless network, the frustrations of browsing restricted typically by limited display size, by slow wireless network response and by limited bandwidth, can be mitigated. The summaries can contain more information than the conventional one page annotated list. The methods are based on a recognition that query response cycle time is dominated by network latency, and that the marginal cost of a bigger first download to the mobile device is small.

Additional features and aspects of the invention will be described below.

Any of the additional features can be combined together and combined with any of the aspects. Other advantages will be apparent to those skilled in the art, especially over other prior art. Numerous variations and modifications can be made without departing from the claims of the present invention. Therefore, it should be clearly understood that the form of the present invention is illustrative only and is not intended to limit the scope of the present invention.

BRIEF DESCRIPTION OF THE DRAWINGS

How the present invention may be put into effect will now be described by way of example with reference to the appended drawings, in which:

FIGS. 1 to 3 show embodiments of search systems according to the invention,

FIG. 15 shows content summary screenviews.

DESCRIPTION OF THE PREFERRED EMBODIMENTS

Figure 3:
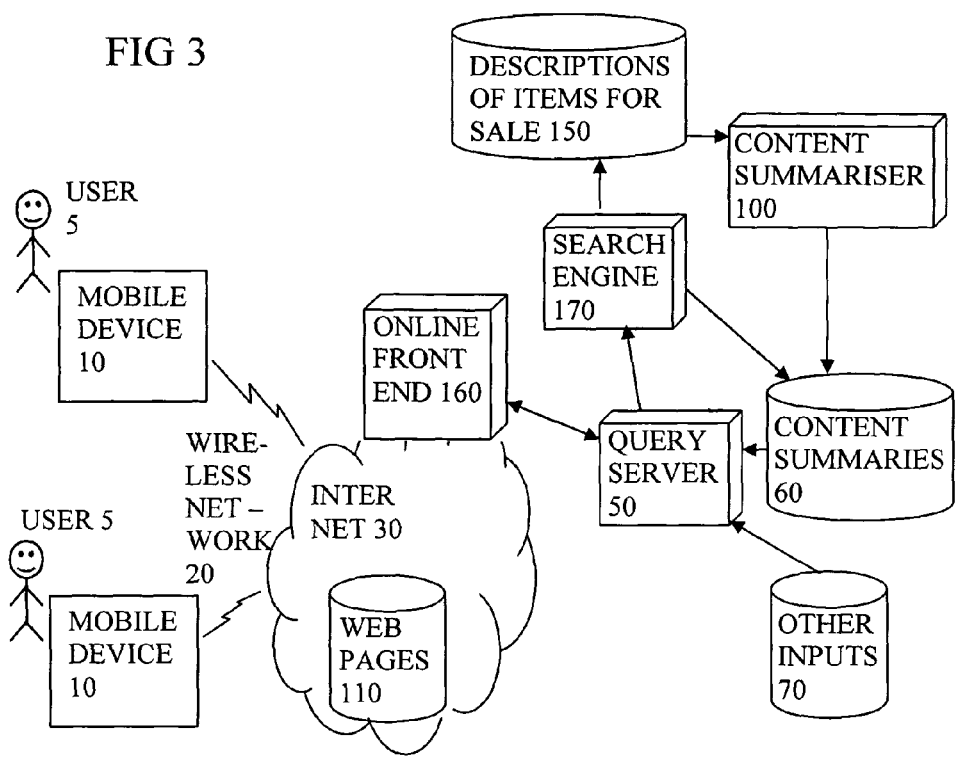

FIGS. 1, 2 and 3 show "geographical" views of some of the principal entities involved in some of the embodiments. This is followed by views of sequences of events according to the prior art and according to embodiments of the invention.

The embodiments described involve browsing results of a search query by receiving results on a wireless device in the form of a package which can include a content summary for each item of the search results, including multimedia items and a number of other features to make browsing more rapid or convenient, especially to overcome physical limitations of handheld mobile devices with limited capabilities for display or for scrolling or selecting, and the physical limitations of the wireless network. This will be referred to as a content summary package (CSP). The package can be arranged as a page extending over a number of browsable screenviews. This can provide more information and/or a more convenient arrangement for browsing, compared to the normal annotated result list provided by traditional search engines. The quantity and presentation of the summary of each content item can be tailored to suit the device to best take advantage of the mobile device physical format. For example each content summary could be arranged to fill a small format screen of a handheld mobile device. The content summarized can be Web pages, news items, sound or video clips or many other types of content for example.

Figure 11:
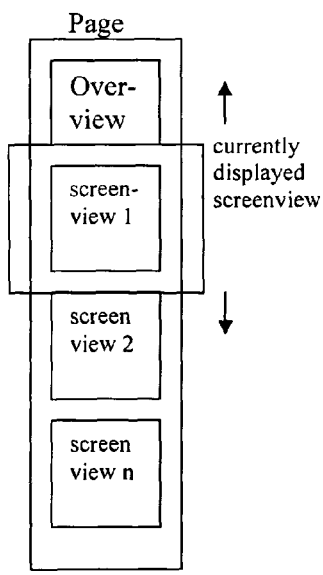
FIGS. 11 and 12 show vertical and horizontal stacks of screenviews of a page.
Figure 12:
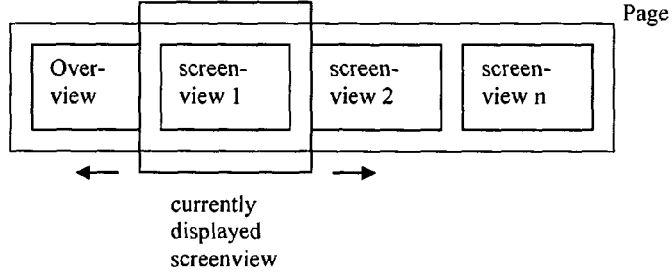

FIGS. 11, 12, Pages, Screenviews

A page of content can be an instance of an XHTML (or other) document that (typically) is much larger than the physical display of the mobile device, such that the width of the viewable content in this page is the same as the physical display width, but the height is much greater. This can be seen as consisting of a vertical stack of adjacent (or, optionally, spaced out with white space) screenviews such that each page region fits the display, as shown in FIG. 11. There is also the case where the screenview may be somewhat taller than the actual display size, but still much smaller than the full content page, and the content within the bottom portion of the screenview is viewed by scrolling a little within the screenview.

There is also the horizontal stacking case, as shown in FIG. 12, where the page of content is defined as an instance of an XHTML or other document that was much larger than the physical display of the mobile device, such that the height of the viewable content in the page was the same as the physical display height, but the width was much greater. A page then consists of a horizontal stack of adjacent (or, optionally, spaced out with white space) screenviews such that each screenview substantially fits the display. A page may have a combination of vertically and horizontally stacked screenviews. Another possibility is a stack in the time domain, much like a timed presentation of slides or video frames, and this again can be combined with horizontal or vertical stacks. Any of these can be combined with multimedia types of presentation.

A page is one possible presentation format of a content summary package, useful to take advantage of widespread use of browser software to read hypertext pages in mark up languages, such as the standard XHTML microbrowser built into many mobile device. If this is the chosen presentation format, then the screenview is the presentation format of an individual content summary.

Other presentation formats are possible, using for example a custom Java application client downloaded onto the device. In this case, a content summary Package can be formed within an XML document or even within a binary file format, and individual content summaries could be expressed likewise as (smaller) XML documents or binary files.

Screenviews are intended to encompass a portion of a web page (or other page based display medium) suitable for display by a browser or equivalent software on a mobile device. The size of a screenview can be determined dynamically by discovering the actual size of the display of the device being used, or by taking a default value based on estimates or typical devices used most frequently. A margin can be provided around the screenview to allow for different actual display sizes. The content summary sizes can be chosen to substantially fill a screenview of the mobile device. A next screenview can be selected by a user for display by scrolling, or more conveniently in some embodiments by using a hyperlink. Hyperlinks are intended to encompass hypertext, buttons, softkeys or menus or navigation bars or any displayed indication or audible prompt which can be selected by a user to cause the screenview to move to a different part of the page. Users can access a start point of the information by clicking on a button or a hypertext link embedded elsewhere in the web page. This is often much more convenient than scrolling, which is too time consuming if there are multiple screenviews to scroll through, or if it is desired to flick backwards and forwards between an overview and content summaries for example.

The package of screenviews can be implemented as a page in XHTML Basic for example. As indicated by the W3C website, XHTML Basic is the second Recommendation in a series of XHTML specifications. The XHTML Basic document type includes the minimal set of modules required to be an XHTML Host Language document type, and in addition it includes images, forms, basic tables, and object support. It is designed for Web clients that do not support the full set of XHTML features; for example, Web clients such as mobile phones, PDAs, pagers, and settop boxes. The document type is rich enough for content authoring. XHTML Basic is designed as a common base that may be extended by additional modules from XHTML Modularization such as the Scripting Module. Thus it provides a common language supported by various kinds of user agents such as browsers. It is useful if the page format can be read and presented by many different versions of "legacy" browsers to maximize the user base among existing mobile telephone users for example.

FIGS. 1,2,3, Embodiments,

FIG. 1 shows the Internet 30, and two mobile devices 10 of end users 5, coupled to the internet over a wireless network 20. In principle, the mobile devices could be coupled to other applications, for example in car computers with voice interfaces to enable users to search and obtain information from the web while driving. In FIG. 1, cylinder symbols represent stored information such as databases which may be implemented on a hard disc or in semiconductor memory for example, and may be distributed or local, and may be managed with appropriate back up and access security, following established practice. Cuboid shapes in this figure represent processes which may run as application software on their own server or be distributed or may share a server for example. The search query is typically one or more keywords sent by the browser to the known internet address (URL) of the query server. It is sent as a request and is sent via a conventional protocol stack in the mobile device to enable communication over the wireless communications network. The protocol stack typically comprises the standard WAP or TCP/IP protocols which allow the mobile device to communicate with internet hosts and the transport and physical layer protocols, for example GPRS or the third generation UMTS protocols, that enable the mobile terminal to access and communicate data over the wireless communications network. The mobile terminal establishes a communications link to a WAP gateway or network access server (NAS) that interfaces the wireless network to the internet and routes the browser's request across the internet. The query server 50 is coupled to the internet via a web server 40. Search queries are received by the query server and passed to a search engine 105 for searching for relevant content summaries in a content summary database 60, managed by the search engine. Optionally the query server can operate as a front end only, in which case it could select a search engine of another organization at a remote location, which would use a content summariser and store of content summaries of that other organization or location. The functions remain similar wherever they are carried out or by which ever organization. Optionally the query server can be located at the interface between the wireless network and the internet, and be part of a service provided by the wireless network operator. The relevant content summaries are returned to the query server and formed into a package suitable for browsing on the mobile device of the user. Other inputs 70 are fed from a store to the query server for use in forming the package. Such other inputs can include advertising or news material for presenting to the user, or characteristics of the mobile device or its browser, characteristics of the wireless network channel, user location, user preferences and so on, for use in determining how much to send, and in what format and so on. The query server sends the package via the web server, the internet and the wireless network to the mobile user.

A content summariser 100 is provided to build up the database of content summaries. A web crawler 80 searches the world wide web via the internet 30 to assemble a copy of web pages in a web mirror, which is then accessed by the content summariser 100.

FIG. 2 shows an alternative embodiment having some similar features to FIG. 1, and corresponding reference numerals have been used as appropriate. In this case, the content summaries are created on demand by processing the search results coming from an existing search engine. The query server passes the query to one (or more) search engines. The search engine then operates in the normal way to retrieve a results list in response to the search query. The content summariser builds its summaries by following the links to web pages from URLs in the results list, loading these web pages, and processing them to extract the appropriate summary information. In the case where the query server is passing the query to multiple search engines, it is acting as an enhanced metacrawler which is carrying out an additional content summarization step when compared with existing metacrawlers.

FIG. 3 shows another alternative embodiment having some similar features to FIG. 1, and corresponding reference numerals have been used as appropriate. In this case, the search is of items for sale via an online store or marketplace, and content summaries are created on demand or off line, or some combination. An online front end 160 to the store or marketplace, (such as Ebay™ or amazon™) receives a search query for an item. This could be direct from the user, or from an intermediary service which searches many on line stores or marketplaces for example. The front end passes the search query to the query server 50. This could be arranged so that all search queries are handled by the same query server, or the front end might distinguish those from mobile devices over a wireless network and just pass those to the query server. This manages the search by passing the query to a search engine 170 arranged to search either or both of a database 60 of content summaries, and a database 150 of information on items for sale. In the latter case, results are passed to a content summariser 100 and content summaries are stored in database 60 as before. Relevant content summaries, are fed from the store. to the query server for packaging and sending to the mobile device.

Figure 4:
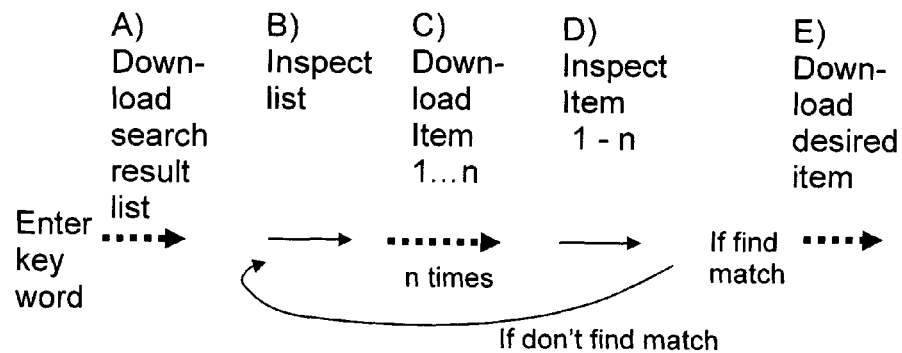
FIG. 4 shows a known sequence of events.
Figure 5:
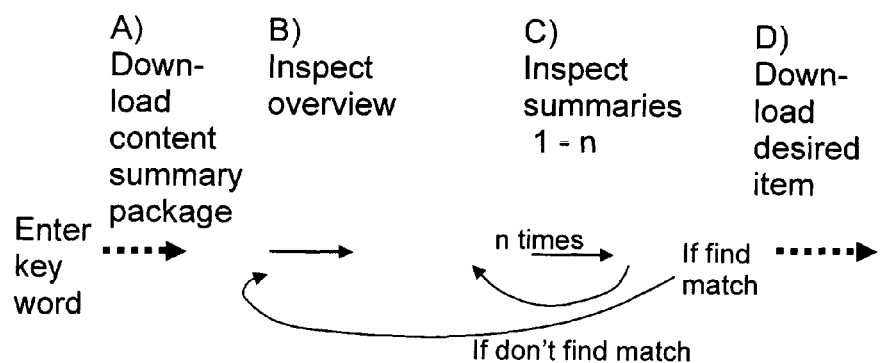
FIG. 5 shows a sequence according to an embodiment.
Figure 6:
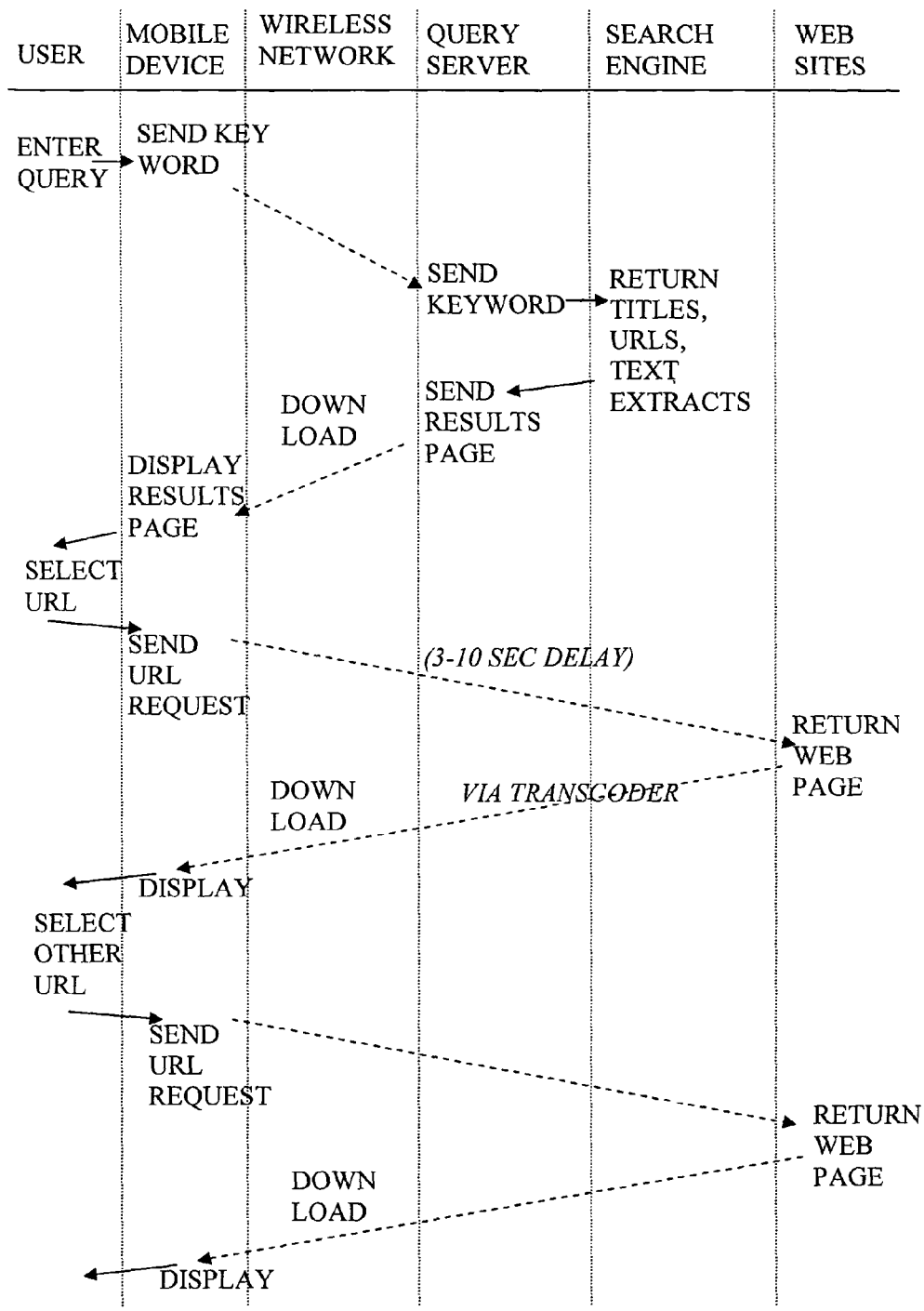
FIG. 6 shows a known sequence of events.

FIGS. 4,5,6 Comparison to Known Methods

FIGS. 4 and 5 show schematically a sequence of events according to a conventional method and according to an embodiment respectively. In both cases, a dotted line arrow indicates a user input such as a click which is expensive in terms of response time. A solid arrow represents a user input such as a click which is cheap in the sense of not incurring delays from query and response operations over the wireless network. In FIG. 4, after a keyword is entered, this click causes at step A, a search result list to be downloaded across the wireless network to the user. At step B, the list can be inspected and a selection made. This click results in a download of an item of content at step C. At step D this item of content can be inspected. Typically it will not be exactly what is required. These steps C and D may need to be repeated until the user is confident that the correct or best item has been found. Step E represents the desired item being downloaded.

In FIG. 5, a keyword as entered as before, and in this case, a package of content summaries is downloaded. At step B, an overview is inspected, and from this a choice is made to inspect a selected summary. This uses a cheap click (cheap in terms of time incurred) as shown. It can be repeated many times, to present different screenviews without the inconvenience of response delays, as shown at step C. Once a match or best match is found, at step D, the desired item is downloaded in full. Thus as can be seen, the browsing loop of reviewing the summaries for a match no longer contains the time-expensive click, so such browsing can be accomplished more quickly and conveniently.

In other words this means:
1) the user can determine which of the search results is useful, prior to requesting the entire content item, by first inspecting a summary which is longer than the normal 10 to 20 word summary of the item contained within a mobile search engine results list, without having to suffer the time delay latency effect of the wireless network. In this way a user can quickly determine which search results are useful before having to incur the long time delays of making subsequent requests for content items over the wireless network.
2) The user spends less time in searching for information or content items because fewer requests over the wireless network are required before the user has high confidence that he has found a useful result.

Figure 7:
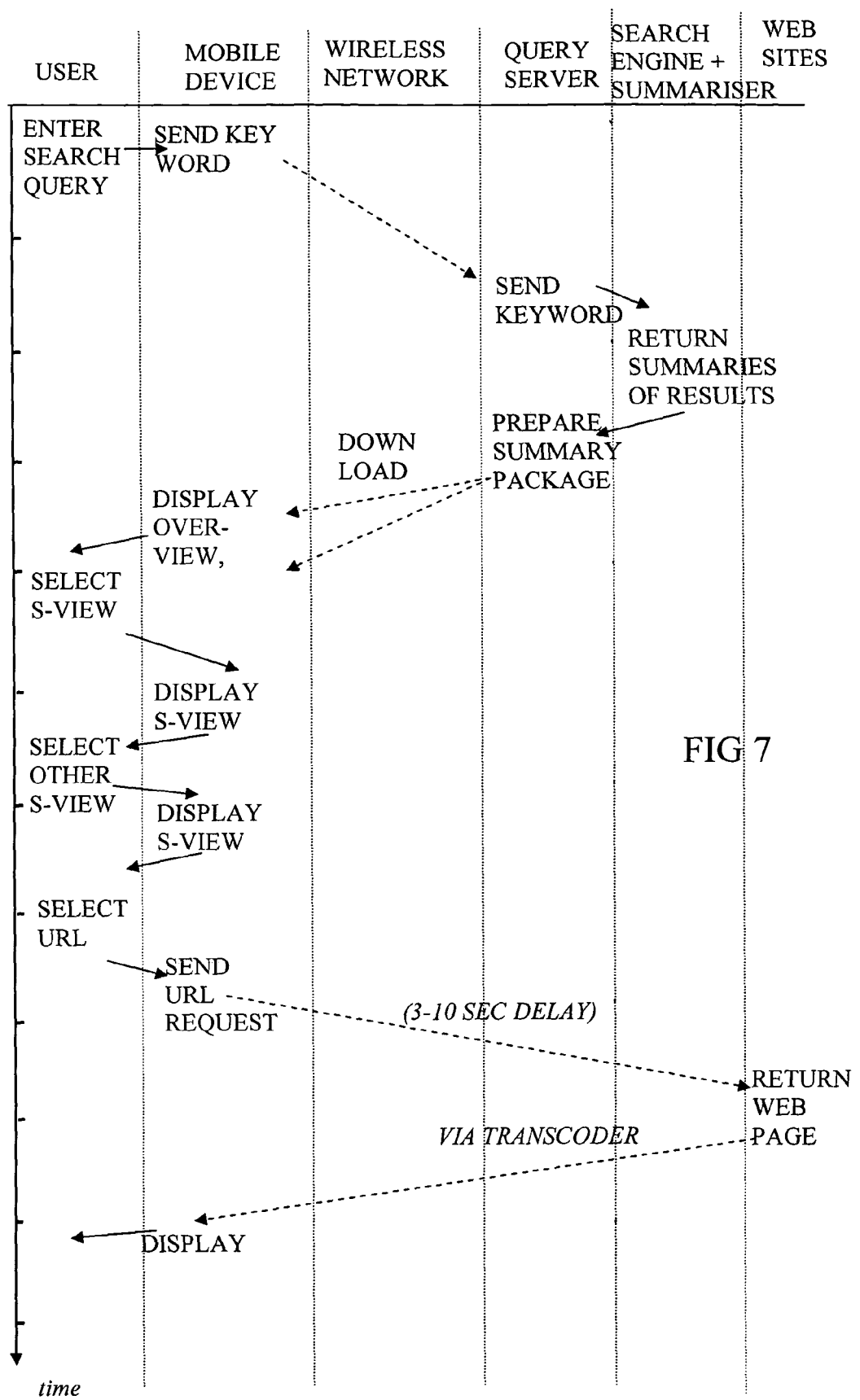
FIGS. 7 and 8 show sequences of events according to embodiments.
Figure 8:
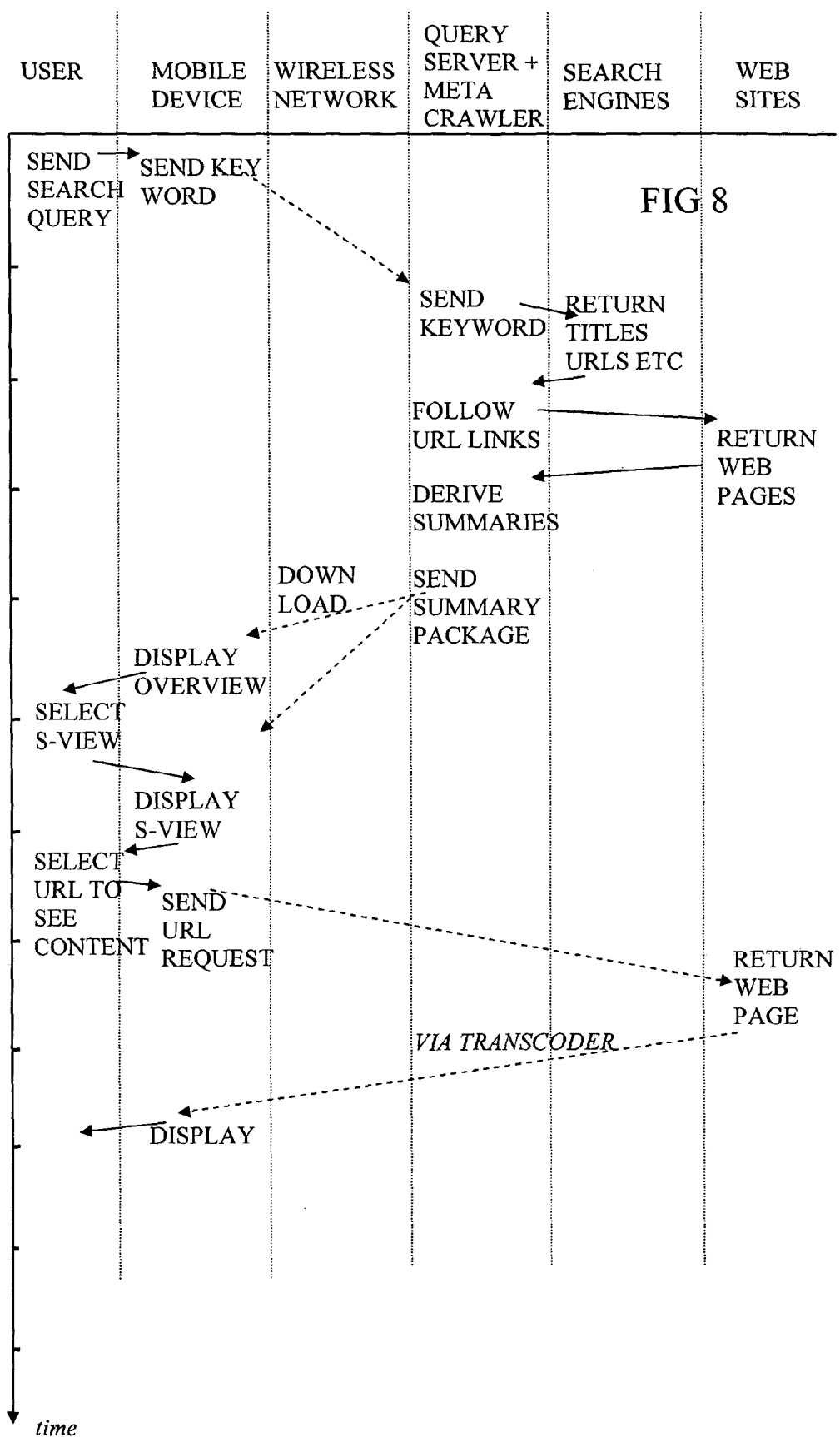

FIG. 6 shows a sequence chart of conventional actions of various entities with time flowing downwards, for comparison with FIGS. 7 and 8 which show corresponding charts for embodiments of the invention. In FIG. 6 a user enters a query into the mobile device (in principle the query could be entered elsewhere such as a desktop computer, for sending results to the mobile device). The mobile device sets up a path for the query and response operation using e.g. WAP or TCP/IP protocols with the query server. This typically involves an exchange of many low level messages, adding to the delay or latency of the wireless network. This enables the keyword to be sent to the query server, which communicates with a search engine to return results in the form of titles, URLs and text extracts having the keywords. A page of these results in the form of an annotated list is sent to the mobile device. As shown by the dotted line arrows, this download across the wireless network causes significant additional delay. The results page is then displayed by the mobile device. A user can then select one of the results and click on it to cause the browser on the mobile device to send a URL request. This will be routed across the wireless network to a transcoding engine which will access the original web page corresponding to that URL, and reformat it into a form suitable for display on the screen of that mobile device. If this document is not quite what the user wants, the request and download process is repeated.

FIGS. 7, 8, Embodiments

A first embodiment can be summarized as follows:

Spider the Web as before.

Extract content summaries from each web page based on a category of content found on that page (e.g. text, image, video)

Store and index summaries in an indexed database.

Receive a query, obtain search results from the indexed database.

Customize the display of the content summaries to the mobile device and/or its browser, Send a set of summaries to user as a package, optionally include advertising material and other information of potential interest.

Display on the mobile device a short overview of items in the results, optionally including an entry to the advertising material.

Subsequently display each larger summary in response to input such as clicking on a URL, on a button, or scrolling by the user.

This can help overcome problems such as mobile devices having small screen sizes, and X-HTML being limited in capability. It need not be limited to particular mobile device characteristics or browser. It helps overcome the problem that network fetches are time-expensive, and that even newer faster networks will suffer from congestion at peak times and show latency effects.

The generation of these content summaries can be carried out offline or on demand, or some combination of these options. If done offline, they can be stored in an indexed database which is integrated within an overall search engine architecture, so that the summaries may be more rapidly retrieved in response to a user query. If the summaries are generated on demand, this requires following the links in search results obtained from existing search engines, to obtain the whole content items, such as web pages. The system can optionally be set up as a metacrawler acting as a front end to existing search engines. The summaries can then be created from the whole content items obtained from multiple search engines.

FIG. 7 shows a sequence chart for an embodiment where content summaries are prepared offline. As in FIG. 6, a user sends a query which involves setting up a path to a query server. In this case the search engine searches an indexed database of content summaries and returns relevant content summaries to the query server. The query server prepares the package of summaries (examples are described below), and downloads it to the mobile device across the wireless network. The mobile device displays the first screenview of the package which is an overview screenview in this case. This may occur while other screenviews are still being downloaded, as shown by the second dotted line arrow at this point. A user can select another screenview to cause one or more of the content summaries to be presented. This browsing can be repeated until the user finds a summary which suits then they can select a URL to request the whole content item, usually via a transcoding engine if the mobile device has a small screen size. Alternatively the user can request more content summaries be sent, or can retry the search with different keywords for example.

FIG. 8 shows an embodiment where content summaries are prepared on demand. In this case a query server implemented as part of a metacrawler receives the keyword and selects one or more search engines to search the content. These conventional search engines return titles, URLs and other data. The metacrawler receives these results then prepares content summaries by using each URL to request the corresponding content, then extracts the summary from that content. The resulting content summaries are arranged in a package as before, for sending to the mobile device. The browsing can follow as described in relation to FIG. 7.

Embodiments can provide a minimum system which streamlines the process of mobile search. It can be implemented as in FIG. 8 as a metacrawler in front of existing search engines (e.g. Google™, Yahoo™, MSN™) or as a subsystem which is more tightly integrated into an overall search engine system. An additional level of summarisation of the original content items (whether they be Web pages, WAP pages, news items, sound or video clips, or local information such as e.g. yellow pages or white pages) can be created in addition to the normal annotated results list provided by search engines like Google. It transmits these content item summaries to the mobile device as a single-shot package (a CSP) in response to a keyword-initiated search.

In other words, the creation of content summaries and CSPs in a web search service for mobile devices could be done in two or more different ways:

In Mode 1, the Integrated Search Engine mode, content summaries would be created within the back end infrastructure of a search engine service. A content summariser scans a web mirror containing a large number of web pages to distill/extract the content summaries, which are then held in a database for subsequent retrieval in response to search queries. In an alternative, at least some of the content summaries are derived by the content summariser in real time from either the web mirror or from a fast local cache of web pages.

In Mode 2, the Metacrawler mode, content summaries could be created on the fly within a metacrawler-type system that relays search queries from end users to a number of existing search engines. When the metacrawler receives the results list from the array of search engines, it loads the Web pages referenced in the results list, and extracts content summaries from these pages in real time. These multiple content summaries are packaged up into single CSPs for efficient transmission to the user over the wireless network.

The additional level of content summaries gives the user sufficient information about the content he/she is seeking that he can have high confidence in it before clicking through to the underlying content item on the WWW. The system allows the mobile user to quickly navigate through a set of content summaries cached within the local device browser to find what they are looking for, without the need to incur expensive clicks over the mobile network. In this way the user experience of mobile search is dramatically improved.

CSPs can be implemented as XHTML Mobile Profile or XHTML Basic web pages, using either bookmarks or multipart messages, allowing the result set to be arranged as a stack of linked screenviews.

Figure 9:
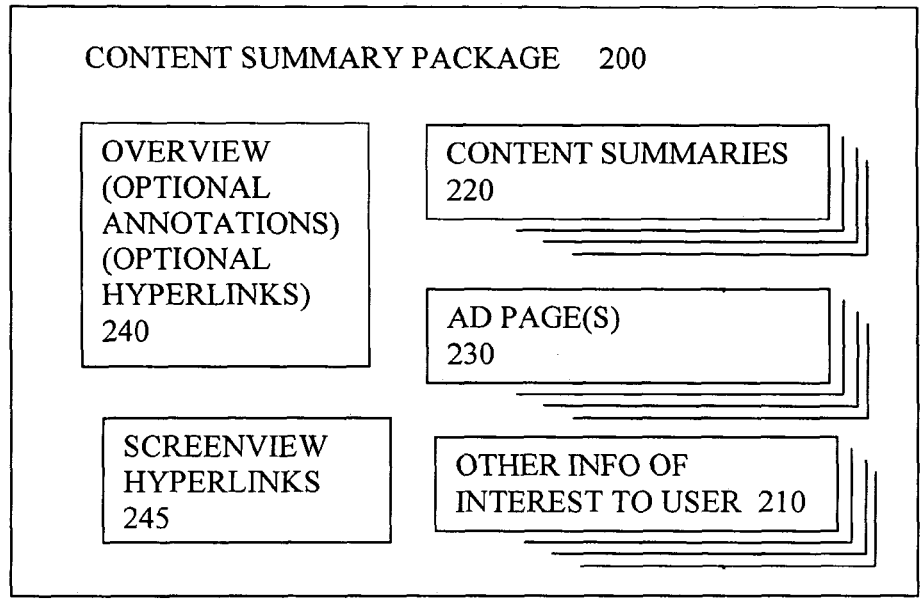
FIG. 9 shows a package of content summaries
Figure 10:
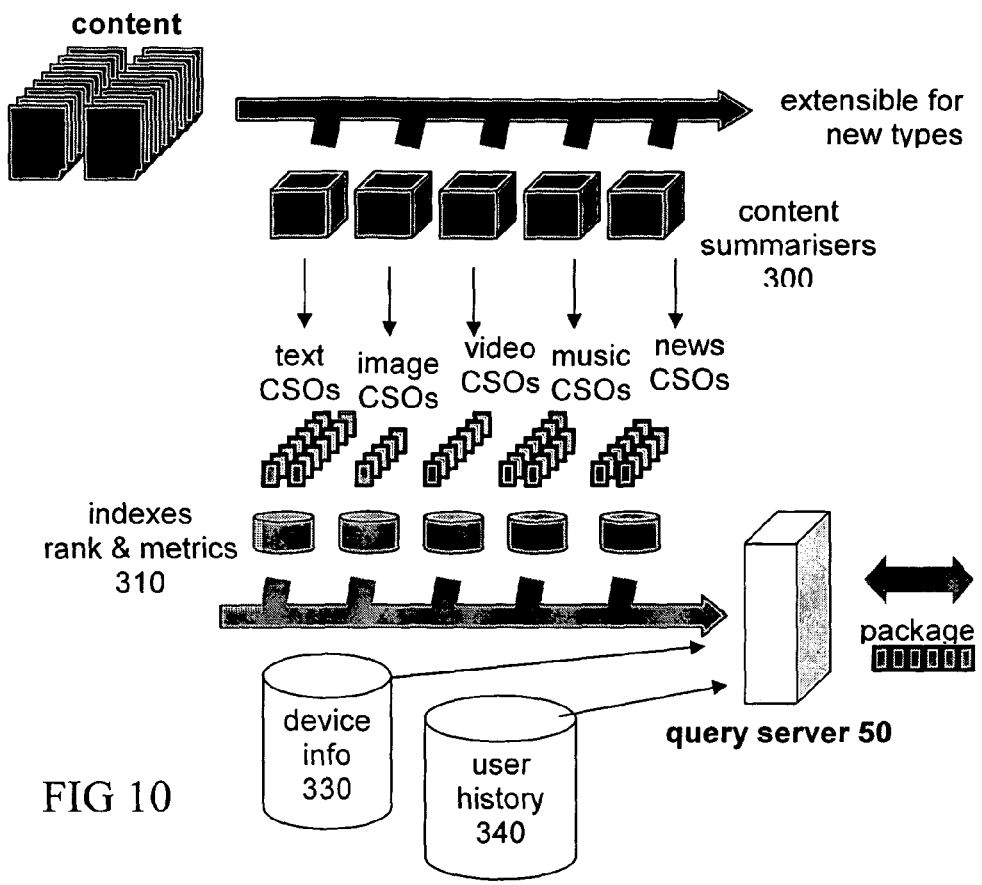
FIG. 10 shows an arrangement for generating content summaries for a query server.

FIGS. 9, 10 Content Summary Packages

The search result set, plus the additional set of larger summaries of these same items, called Content Summaries, is received by the user in a single query and response operation over the wireless network, so that the user may more easily identify the item he or she is seeking before having to initiate subsequent query and response operations over the network.

The package of overview of search results and the Content Summaries to be displayed to the user on the wireless device can be in a format suitable for the native browser on the device, or can use or include a separate software program running as a user application on the device. FIG. 9 shows schematically an example of a content summary package. It has an overview 240, content summaries 220, screenview hyperlinks 245, advertising screenviews 230, and other materials 210. The overview can have optional annotations, can be formed of several screenviews showing different overviews, and optionally it can have hyperlinks to other screenviews. In some cases, the overview can be displayed in a separate frame so that it can still be viewed when viewing other screenviews.

FIG. 10 shows an example of an arrangement for creating the content summaries. Content is fed to content summarisers 300 for summarizing a different category or type of content. So one content summariser produces text content summaries, another produces image content summaries, another produces video content summaries, another produces music content summaries, another produces news content summaries. These content summaries are stored as content summary objects (CSOs) and stored in databases which are indexed. The indexes 310 are consulted when the query server 50 searches for relevant content summaries. The content summaries found are fed to the query server for incorporating into a package. A store 330 of device information and a store 340 of user history 340 are provided to enable the query server to tailor the package. The query server can create the overview screenviews from the content summaries.

The content summary database or index to it can store meta-data about its respective content item or the web page holding that item as follows. Such meta data might constitute one, some or all of the following aspects of a media item:
- size
- image/frame dimensions
- length in time
- CRC (cyclic redundancy check) over part or all of data
- Embedded meta data, eg: header fields of images, videos etc
- Media type, or MIME-type The overview can be a conventional annotated list having brief descriptive information of up to 60 or so words on each item, plus other descriptive information such as the source web site, date, etc, or can be provided in other forms such as a non-annotated list, a list of groups of items, a multilevel list, capable of showing more or less information about each item or groups of items, or an array of thumbnail images, or a scrolling sequence of views of successive items, for example.

Content Summaries

A content summary can encompass an aspect of a web page (from the world wide web or intranet or other online database of information for example) that can be distilled/extracted/resolved out of that web page as a discrete unit of useful information. It is called a summary because it is a truncated, abbreviated version of the original that is understandable to a user.

Example types of content summary include (but are not restricted to) the following:
- Web page text—where the content summary would be a contiguous stretch of the important, information-bearing text from a web page, with all graphics and navigation elements removed.
- News stories, including web pages and news feeds such as RSS—where the content summary would be a text abstract from the original news item, plus a title, date and news source.
- Images—where the content summary would be a small thumbnail representation of the original image, plus metadata such as the file name, creation date and web site where the image was found.
- Ringtones—where the content summary would be a starting fragment of the ringtone audio file, plus metadata such as the name of the ringtone, format type, price, creation date and vendor site where the ringtone was found.
- Video Clips—where the content summary would be a small collection (e.g. 4) of static images extracted from the video file, arranged as an animated sequence, plus metadata The collection of summaries is obtained by scanning the WWW and is then indexed and made available to the search service. The items scanned can include items from the deep web, that is dynamically generated web pages generated from live databases behind the web page, such as weather forecasts, travel timetables, stock quotes and so on. Search queries result in a collection of relevant content summaries being returned to the user.

A notable advantage of obtaining, storing and sending results in content summary units rather than page units is that they can be adapted to different screen sizes more easily to make better use of the confines of the limited screen real-estate of a typical hand held mobile device. Further, the presentation of content summaries such as size, font size, colors or media types used for example, can be tailored depending on the characteristics (browser, screen colour depth and size, video capability, ringtone capability etc) of the user's device. The package size can also be tailored to suit the browser of the device, or characteristics of the wireless channel, such as bandwidth, latency or quality. For example an operator of the wireless network might have a network management system with live information about the currently available bandwidth or other channel characteristics for each connection. This could be passed to the query server, to enable it to dynamically decide how large the next package on that connection can be, and so decide how many content summaries or how large each summary can be without the user noticing undue delay. Furthermore, the size of a screenview can be adapted, to suit an actual display size or other factor for example. This might affect where hyperlinks are located in the page, if it is desired to present hyperlinks at the same place in each screenview, for ease of use.

This tailoring might be achieved by storing the content summaries in a device neutral representation (which could be XML but doesn't have to be) and then transforming them (possibly with XSLT) either on the fly (per request depending on the user's device) or preparing transformed content summaries in advance.

A second advantage to content summaries is that several can be collated together to form a web page having a number of screenviews, in other words a single CSP that can be transmitted more efficiently to a wireless device. This means that several results can be downloaded to a device whilst only incurring one instance of the network latency. The user can quickly scroll, or page, through the result set. This is in contrast to traditional search results that require the user to click on each search result and wait for it to download before being able to glean any information or determine that the result was not relevant.

Content summaries can be grouped into categories, e.g. images, webtext, ringtones, videoclips, news items, addresses. Such categories can be based on content categories or on media type. Categories can be used to assist in the presentation of sets of results to a search query. The user could be offered the choice of category of result before being presented with the results of a particular category. Alternatively, the user could have already expressed a preference (either via their mobile device, or using a desktop to access their mobile-search account preferences), and results from the user's preferred category presented first.

Content summaries can be extracted from web pages containing any machine readable content format. This includes all flavours of HTML, JavaScript, FLASH, PDF, Microsoft Office documents etc. Content summaries might be the whole page if the page is small and has a high information density, or it might just be a small subset of the content of the page.

Content summaries might be inserted by other means than by automated scanning (crawling) of the web. E.g. by manual insertion or custom conversion of third party databases. Content summaries are primarily a way of storing units of information that can be collated and displayed conveniently on a mobile device. A good application of these is in the implementation of a web search service for mobile devices where a lack of alternative means of finding and displaying the information exists. A second application is in access of an online store or marketplace (e.g. Ebay™) where a mobile user wishes to search for a multitude of candidate items to bid on or purchase.

CSPs

Result sets from searches initiated by a mobile user can be arranged as a stack of linked content summaries, each result corresponding to a single content item. These Summaries are then combined into a single package (CSP) prior to transmission to the mobile device.

This CSP can be formatted as a webpage. Individual content summaries can be linked within Summary Packages using intra-page hyperlinks (called bookmarks in HTML, XHTML Basic and XHTML Mobile Profile). Clicking on a bookmarked link is then just a jump in the view of the current page and does not involve the browser returning to the network to fetch the next page. The user receives this Summary Package (actually a stack of web screenviews) in a single network fetch-response cycle and can then browse through the contained results with quick clicks on the intra-page links.

In XHTML Mobile Profile the anchor tag <a> with the href attribute set to a bookmark can be used to implement this method. The effect of this navigation method is to enable page-by-page scrolling rather than the pixel-by-pixel or line-by-line scrolling normally offered via the device's up/down/left/right navigation keys.

Bookmarks are a standard and well understood technique in desktop web pages. They are normally used to offer fast links to specific sections of a large documents. However, bookmarks have not often been used to link consecutive screenfuls of content—this being especially useful on a mobile device which typically has a reduced keyboard with no page up or page down key, as well as a small format display.

Content Summaries are a very convenient unit for each screenview in a linked stack of search results. Each screenview is then a candidate result item for the search query, and the set of results can be stepped through with a quick-to-load (because it's just a move) click per result. This clicking can step through results of different types (for example different media categories such as text or images) simply by arranging for the stack of content summaries (screenviews) to come from these different categories.

CSPs can incorporate sponsored links similar to those used in the desktop search service environment. Where the advertiser has mobile-specific webpages, these sponsored links can point directly at these pages. However, where an advertiser does not have mobile-specific web pages, they can instead provide advertising collateral to the search service. For each content summary item, a hyperlink having a URL can be provided to let the user click down to the underlying content item found on the WWW. Each and every page in this system can have a single AdLink (a hypertext link or clickable button that links to a page of advertising content). When a user clicks on an AdLink, an AdPage is presented, which is a textual page which is carried in the payload of the search query response page. A link at the bottom of the AdPage is provided to make a request over the wireless network to load further advertising material.

Figure 13:
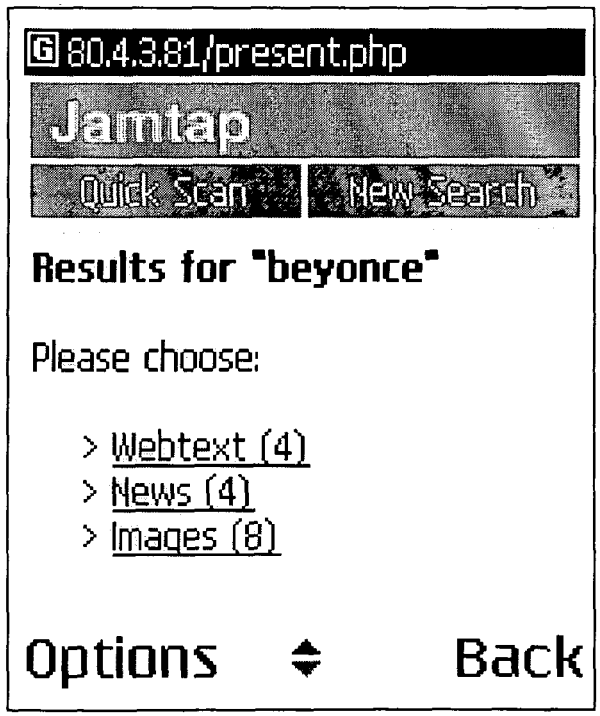
FIGS. 13 and 14 show overview screenviews.
Figure 14:
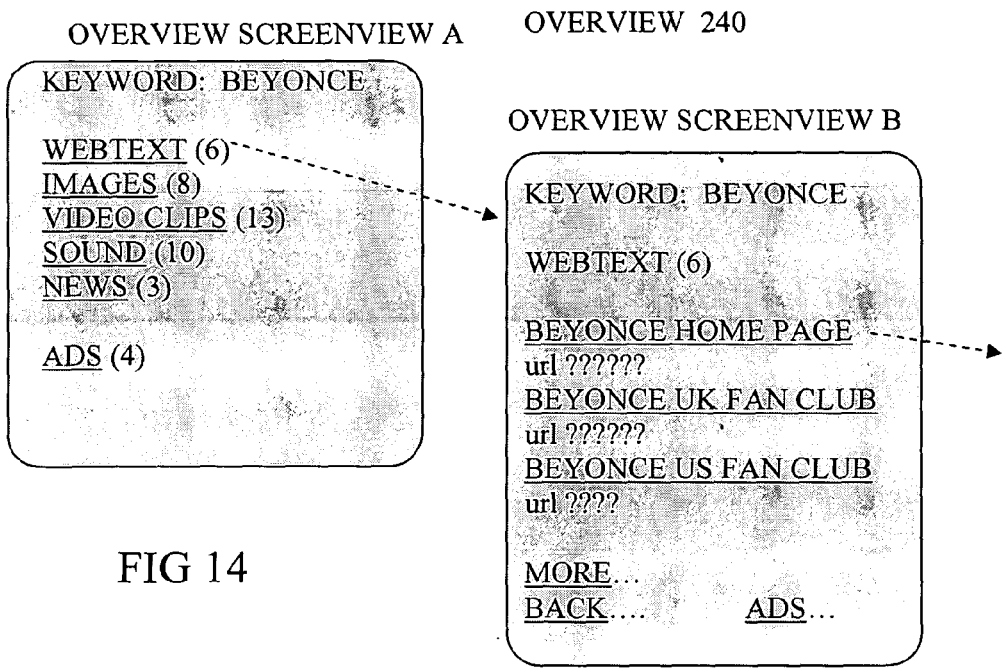

FIGS. 13, 14, Overview Examples

An example of an overview page is shown in FIG. 13, another example, showing two levels, is shown in FIG. 14. In FIG. 13, an overview includes fields for offering a quick scan or a new search. A next line shows the keyword or words, then the categories of webtext, news, and images together with a number in brackets of items found. In FIG. 14, a multi screenview overview is shown, together with hyperlinks to select them. Screenview A shows a top level showing the number of items found in different categories. Each underlined text is a hyperlink to another screenview. For example the clickable link "Webtext" leads to screenview B. This shows an annotated list of some of the items. For each item, the underlined text will link to the content summary for that item, and a URL is shown to enable a user to download the whole content item.

Another option is the following layout:
Results for "beyonce"
Please choose:
   Web (4)
   Wap (4)
   News (12)
   Local (3)
   More (54)
Plus a single clickable AdLink at the bottom When a user clicks on any of Web, Wap, News, or Local hyperlinks they are taken to a sequential list of content summaries within that category.

When a user clicks on Other, they are taken to a second results list, structured as follows, which contains the heavier multimedia summaries:
Results for "beyonce"
Please choose:
   Images (14)
   Ringtones (15)
   Videos (15)
   Back When a user clicks in either of these category headings, there can be a fetch over the wireless network to display the summaries of those items, rather than including them in the first sent package, if there is not sufficient space in the first sent package. Sets of image summaries, ringtone summaries and video summaries may each take up about 20 Kbytes of memory, chosen according to user convenience or other factors, as described below in more detail.

In a 3G version of the system, the Summaries for these heavier multimedia items are pre-fetched with the rest of the Summaries in a single shot operation, although still spread out onto two pages for ease of presentation. It should be understood that many different arrangements for the content or layout of these overview screenviews, are possible, these examples are illustrative only.

FIG. 15, Content Summary Examples

FIG. 15 shows several examples of content screenviews which could be found for the example keyword "Beyonce", as described above and shown in the overview screenview examples of FIGS. 13 and 14. Each screenview has one content summary, though in principle there can be more than one per screenview. Each screenview may substantially fill the screen, or there may be room on screen to show other items such as a navigation bar to show how far through the package is the current view. Or a part of the overview screenview could be shown. Each content screenview in this example has hypertext links at the bottom, to a next screenview or back to a previous screenview. Screenview A shows an extract of a webtext item. Screenview C has an overview in the form of a news headline and thumbnail picture. Screenview B shows a content summary for a video in the form of a storyboard of video frames and an example for ringtones or other audio. For the video clip, the frames shown can be presented as a timed sequence of frames changing every few seconds for example. A hyperlink is provided to download a larger summary in the form of a real time sample of the video, lasting 5 seconds in this case. Another hyperlink provided to download the entire video clip, several minutes long in this case. For the ringtones, a hyperlink labelled "try" is provided to the ring tone to be listened to. Another hyperlink enables the ringtone to be bought. Screenview D shows an example of an overview for images showing a number of thumbnail images. Each can be provided with a hyperlink to download a larger, higher resolution image. Although shown with one content summary per screenview, the content summary can of course extend over two or more screenviews, and the hyperlinks can be located on each screenview, or on each content summary for example.

For some types of content, it may be convenient to provide the user with an additional level of content summary before sending the request to download the actual content item. This "larger" summary could be larger than the standard content summary, but still significantly smaller and therefore faster to download than the original content item on the world wide web. It could involve filling an entire package with just one larger summary. Two examples of where this would be useful are provided below.

EXAMPLE 1

Searching for Content in Web Pages

When searching for information in web pages, it may be useful to provide the user the option of a larger summary that was built up from sections of text extracted from multiple web pages from the source web site, where these sections were still interlinked using a similar hypertext navigation structure to that of the original web site. These sections would be arranged for presentation as screenviews within a larger page, for rapid viewing with clickable hyperlinks, without the need for further query and response operations across the wireless network.

EXAMPLE 2

Searching for Content in Video Clips

When searching for video clips, this larger summary would simply be a longer portion of the video clip than was displayed in the first-level content summary of that clip. If the user wasn't sure from the first-level content summary that the video clip was the one that he or she was seeking, they could download the larger summary before deciding to incur the significant time that it would take to download the full video clip.

Size of Content Summary Package

Depending on the mobile network, there is an optimum size of the CSP which balances the benefits of providing more summaries with the additional cost and time incurred from transmitting a CSP compared to a smaller web page: Examples (which can be refined empirically to suit users) now follow. These values may be very different for different networks or different conditions, different user preferences, different applications, and may be varied dynamically according to network conditions for example.

a) Web Page Text Summaries: Up to 1 Kbyte of body text from the centre viewing area of the web page, plus title, size, date, content attribution, search engine attribution. The keyword must be contained within this body text. 6 summaries, total 6 Kbytes, plus 1.2 KByte for AdLinks+AdPages (assuming about 20 or 25 words per ad)
b) WAP Summaries: The entire WAP page, truncated to 0.4 Kbytes. 6 summaries, total 2.4 Kbytes, plus 1.2 KByte for AdLinks+AdPages
c) News Summaries: Up to 1 Kbytes of body text from the news item that contains the keyword, plus title, size, date, content attribution, search engine attribution. The keyword must be contained within this body text. 6 summaries in the sequential set, total 6 Kbytes, plus 1.2 Kbyte for AdLinks+AdPages
d) Local Summaries: The entire Local results page, plus date, content attribution (e.g. Yellow Pages) plus search engine attribution (e.g. Google Local), truncated to 0.4 Kbytes. Up to 6 summaries in the sequential set, total 2.4 Kbytes, plus 1.2 Kbytes for AdLinks+AdPages Total payload for Summaries in a) to d)=21.6 Kbytes e) Image Summaries: 4 image thumbnails per screen, 1 AdLink per screen, 4 screens, 16 images in total, 1 Kbyte per image. When you click in image you get a single image thumbnail plus metadata, plus a URL link through to the underlying source document on the Web. Metadata contains title of image, source web site, search engine attribution, date. 16 Kbytes per set, plus 0.8 Kbytes for AdLinks+AdPages
f) Ringtone Summaries: Sets of ringtone previews, plus vendor name, plus price if available. Up to 16 Kbytes per set plus up to 1.2 Kbytes for AdLinks+AdPages
f) Video Summaries: 2 thumbnails per screen, 1 AdLink per screen, 2 screens, 8 video summaries in total. Each thumbnail sits within a perforated black frame containing an animated GIF with 4 frames. When you click on the thumbnail you get a single thumbnail plus metadata including title of image, source web site, search engine attribution, date. Up to 16 Kbytes per set, plus 0.4 Kbytes for AdLinks+AdPages Package Payload Analysis Examples 2.5G configuration:

| | | |
|---|---|---|
| Results list | | 0.5K |
| Content Summaries: (sets of 6) (+6 AdPages) | | |
| Web | 6K + 1.2K | 7.2K |
| WAP | 2.4K + 1.2K | 3.6K |
| News | 6K + 1.2K | 7.2K |
| Local | 2.4K + 1.2K | 3.6K |
| Total | | 21.6K |
| Grand total | | 22.1K |

Separate content summaries for Images, Ringtones, Videos:

| | |
|---|---|
| Images | 16K + 0.8K |
| Ringtones | 16K + 1.2K |
| Videos | 16K + 0.4K |

3G configuration:
All of this is packaged together
Total=0.5K +21.6K +16.8K +17.2K +16.4K=72.5K Metacrawling Strategy and Timings When the user clicks on the Search button, the Metacrawler fires off queries to specific search engines (see below). It can have a time quota of n seconds to get the responses back from the search engines, mine the 1st level URLs, then process these responses and send the complex page back to the mobile user. A time allowance of p seconds might be spent waiting for the search engine results list responses, another r seconds can be allowed for mining the $1^{st}$ level URLs, then allowing t seconds on top for processing of the results to produce the content summaries. Any search engine top level results coming back after p seconds are not used, since waiting for them would slow the user response time down in an unacceptable way.

The r second time period is spent following the URLs in the search engine results list down 1 level, taking either the web page from the search engine cache, or the page from the World Wide Web, whichever arrives faster. For any page where the link cannot be followed fast enough, it is thrown away.

A final u seconds can be allowed doing the following:
a) Extracting content summaries from the underlying web pages (extraction algorithm can depend upon content category, see summary definitions above)
b) Assembling these content summaries into a contiguous complex XHTML Mobile Profile page
c) Transmitting this page back to the device.

For Web pages with insufficient body text, these are just thrown away. It may well be that the server can spend longer than 1 second for this total process, and keep assembling the content summaries, relying on the progressive rendering capability of the browser to fool the user into thinking that the query response has arrived, when it is still being assembled and streamed down over the air into the device, provided this does not become noticeable to the user. Actual timings can be determined according to what users find acceptable as a compromise between quality of results and acceptable delays, and can be dynamically changed to suit each user or according to network conditions. For every query and Results Set that is processed by the system, a permanent record and a cache of these can be kept so that subsequent identical queries will get processed in a near-instantaneous way. This will allow examination of the sort of searches that users are doing with the system.

Mobile device: The wireless device may be a mobile handset type of device, or any type of mobile computing device, such as a laptop PC with a built-in connection to a wireless network, or with a connection to an external wireless device such as a mobile handset. It may be any mobile communication device adapted to operate within and receive data over a wireless communication network. It may also have voice communication capabilities. It can be any of a data messaging device, a two-way pager, a cellular telephone with data messaging capabilities, a wireless Internet appliance or a data communication device (with or without telephony capabilities), such as a laptop computer or a PDA for example. For use with a cellular network, the device may incorporate a General Packet Radio Service (GPRS) communication subsystem or other equivalent, or may use a voice telephone channel to pass the data in the form of tones for example, following established principles. The mobile device can be made up of several devices, for example it can have a separate display, separate headset or earpiece, separate keyboard, separate storage device, separate power supply and so on, each coupled by wires or wireless connections such as Bluetooth connections. The web browser on the mobile device can be suitable for presenting documents in mark up languages such as HTML and its variants, and should be HTTP compatible. Examples include Netscape Navigator, Sun Hot Java Browser, Microsoft Internet Explorer or micro browser software having similar functions. Many currently available handheld devices with browsers are at least compatible with XHTML Basic and XHTML Mobile Profile.

Mobile network The wireless network can be a cellular network such as a GSM or UMTS or CDMA network for example. Other types of mobile devices and networks are also contemplated.

The Web server can be a PC type computer or other conventional type capable of running any HTTP (Hyper-Text-Transfer-Protocol) compatible server software as is widely available. The Web server has a connection to the Internet 30. These systems can be implemented on a wide variety of hardware and software platforms.

The query server, and servers for indexing and for searching and for metacrawling can be implemented using standard hardware. The hardware components of any server typically include: a central processing unit (CPU), an Input/Output (I/O) Controller, a system power and clock source; display driver; RAM; ROM; and a hard disk drive. A network interface provides connection to a computer network such as Ethernet, TCP/IP or other popular protocol network interfaces. The functionality may be embodied in software residing in computer-readable media (such as the hard drive, RAM, or ROM). A typical software hierarchy for the system can include a BIOS (Basic Input Output System) which is a set of low level computer hardware instructions, usually stored in ROM, for communications between an operating system, device driver(s) and hardware. Device drivers are hardware specific code used to communicate between the operating system and hardware peripherals. Applications are software applications written typically in C/C++, Java, assembler or equivalent which implement the desired functionality, running on top of and thus dependent on the operating system for interaction with other software code and hardware. The operating system loads after BIOS initializes, and controls and runs the hardware. Examples of operating systems include Linux™, Solaris™, UniX™, OSX™ Windows XP™ and equivalents.

The invention claimed is:

1. A method of responding to a search query across a wireless network, having the steps of obtaining content summaries of search results relating to the search query, preparing a package for presentation by a mobile device, and having a number of the content summaries extending over a number of screenviews for a screen of the mobile device, and having hyperlinks for intra-package navigation by a user between screenviews of different parts of the package, to enable the content summaries to be browsed without requiring more query and response operations across the wireless network, the method having the further step of sending the package to the mobile device over the wireless network.

2. The method of claim 1 having the step of incorporating hyperlinks in the package for a user to download items from the search results across the wireless network to the mobile device.

3. The method of claim 1 the step of obtaining the content summaries having the step of accessing a database of previously generated content summaries to find those relating to the query.

4. The method of claim 1 the step of obtaining the content summaries having the step of retrieving items relating to the query and deriving the summaries from the items found.

5. The method of claim 1, the package comprising any one or more of; a document in a hypertext mark up language, an XHTML Basic document, an XHTML mobile profile document, a file or files as application data for page type display by the mobile device.

6. The method of claim 1 having the step of incorporating in the package any one or more of; an overview screenview, an overview extending over more than one screenview, an overview having an indication of numbers of search results, and an overview having an indication of categories of content summaries.

7. The method of claim 6 having the step of deriving the overview by extracting from the content summaries any one or more of the following: a text title, text metadata, a text extract containing a keyword, a thumbnail image, sound extract, a storyboard of video frames, a portion of a video.

8. The method of claim 1, the search results comprising any of; web pages on the world wide web, WAP pages, news feed items, pages from the deep web, geographical data, maps, points of interest locally, and local information, yellow pages, white pages, web pages on an intranet, descriptions of items or services for sale in an online marketplace or online store, and the content summaries comprising any one or more of; text, image, video, sound, advertising material.

9. The method of claim 1 having the step of tailoring any one or more of the content summaries, the size of the package and locations of the hyperlinks in the package, according to any one or more of the following factors; characteristics of the mobile device, bandwidth of the connection to the mobile device, latency or quality of the connection to the mobile device, user preferences, storage capacity of the mobile device, display characteristics of the mobile device, and user location.

10. The method of claim 4 having the step of using a metacrawler to identify and retrieve the items related to the search query.

11. The method of claim 4, the step of deriving the content summary comprising any of the following: removing advertising material, separating text from images, downsampling images, taking sample frames or extracts from a video, taking sample extracts of sounds, identifying news text, identifying image captions or image titles and associating them with their image.

12. The method of claim 3, having the preliminary step of preparing the database of content summaries, by extracting content summaries from the items, and storing them in the database, together with a reference to their corresponding item, and indexing the database, with one or more indications of relevancy to prioritise the items.

13. A method of searching over a wireless network having the steps of sending a search query to a server, receiving at a mobile device a package having a number of content summaries of search results related to the search query, extending over a number of screenviews for a screen of the mobile device, and having hyperlinks for intra-package navigation between screenviews of different parts of the package, and the method having the steps of using the mobile device to present a screenview of a part of the package and using the hyperlinks to cause the mobile device to present different screenviews to browse the content summaries without requiring one or more further query and response operations across the wireless network.

14. The method of claim 13, having the step of any of sending a request for a further package of more content summaries to be downloaded, and sending a request for items from the search results to be downloaded across the wireless network to the mobile device.

15. A method of responding to a search query across a wireless network, having the steps of obtaining content summaries of search results relating to the search query, preparing a package for presentation by a mobile device having a number of the content summaries extending over a number of screenviews for a screen of the mobile device, at least some of the content summaries being arranged for display one per screenview, for a user to browse the content summaries without requiring one or more further query and response operations across the wireless network, the method having the further step of sending the package to the mobile device over the wireless network.

16. The method claim 15, the package having no overview and having hyperlinks for navigation by a user between screenviews of different parts of the package.

17. A method of responding to a search query across a wireless network, having the steps of obtaining content summaries of search results relating to the search query, preparing a package for presentation by a mobile device having a number of the content summaries extending over a number of screenviews for a screen of the mobile device, and an overview screenview, for a user to browse the content summaries without requiring one or more further query and response operations across the wireless network, the method having the further step of sending the package to the mobile device over the wireless network.

18. The method of claim 17, the package having hyperlinks for intra-package navigation by a user between screenviews of different parts of the package.

19. A program on a machine readable medium for carrying out the method of claim 1.

20. A method of providing a search front end service over a wireless network between a user and a search provider, the method having the steps of receiving a search query from the user, selecting a search provider, sending a corresponding query to the selected search provider, receiving from the search provider a package for presentation by a mobile device having a number of the content summaries extending over a number of screenviews for a screen of the mobile device, and having hyperlinks for intra-package navigation by a user between screenviews of different parts of the package, to enable the content summaries to be browsed without requiring one or more further query and response operations across the wireless network, the method having the further step of sending the package to the mobile device over the wireless network.

* * * * *